United States Patent
McArdle et al.

(10) Patent No.: US 7,231,665 B1
(45) Date of Patent: Jun. 12, 2007

(54) PREVENTION OF OPERATING SYSTEM IDENTIFICATION THROUGH FINGERPRINTING TECHNIQUES

(75) Inventors: Mark J. McArdle, Conestogo (CA); Brent A. Johnston, Kitchener (CA)

(73) Assignee: McAfee, Inc., Santa Clara, CA (US)

( * ) Notice: Subject to any disclaimer, the term of this patent is extended or adjusted under 35 U.S.C. 154(b) by 1011 days.

(21) Appl. No.: 09/900,001

(22) Filed: Jul. 5, 2001

(51) Int. Cl.
*G06F 12/14* (2006.01)
*G06F 15/16* (2006.01)

(52) U.S. Cl. .............................. 726/22; 726/13; 726/14

(58) Field of Classification Search ................ 713/200, 713/201
See application file for complete search history.

(56) References Cited

U.S. PATENT DOCUMENTS

| | | | | |
|---|---|---|---|---|
| 5,606,668 A | * | 2/1997 | Shwed | 713/201 |
| 5,835,726 A | * | 11/1998 | Shwed et al. | 709/229 |
| 6,006,328 A | * | 12/1999 | Drake | 726/23 |
| 6,073,209 A | * | 6/2000 | Bergsten | 711/114 |
| 6,247,148 B1 | * | 6/2001 | Annicchiarico et al. | 714/45 |
| 6,253,321 B1 | * | 6/2001 | Nikander et al. | 713/160 |
| 6,289,463 B1 | * | 9/2001 | Fink | 713/202 |
| 6,397,335 B1 | * | 5/2002 | Franczek et al. | 713/200 |
| 6,651,132 B1 | * | 11/2003 | Traut | 711/6 |
| 6,678,734 B1 | * | 1/2004 | Haatainen et al. | 709/230 |
| 6,687,762 B1 | * | 2/2004 | Van Gaasbeck et al. | 719/319 |
| 6,757,841 B1 | * | 6/2004 | Gitlin et al. | 714/7 |
| 6,779,039 B1 | * | 8/2004 | Bommareddy et al. | 709/238 |
| 2002/0083344 A1 | * | 6/2002 | Vairavan | 713/201 |
| 2006/0206892 A1 | * | 9/2006 | Vega et al. | 718/1 |
| 2006/0242704 A1 | * | 10/2006 | Aviani et al. | 726/23 |

OTHER PUBLICATIONS

Bellovin et al, Network Firewalls, 1994, IEEE, pp. 50-57.*
Mazieres et al, Secure Applications Need Flexible Operating Systems, 1997, IEEE, pp. 56-61.*
Epstein et al, Using Operating System Wrappers to Increase the Resiliency of Commercial Firewalls, 2000, IEEE, pp. 236-245.*
Pogue, David, Making Windows More Secure, 2004, The New York Times, p. G.1.*
"Falsify Your BSD OS Fingerprint", http://www.pkcrew.org/tools.html, provided by Cthulhu, Oct. 2, 2001, 1 page.
"Network Scanning Techniques, Understanding How It Is Done", Ofir Arkin Publication Communications Solutions, Nov. 1999, pp. 1-17.

(Continued)

*Primary Examiner*—Ayaz Sheikh
*Assistant Examiner*—Aravind K Moorthy
(74) *Attorney, Agent, or Firm*—Zilka-Kotab, PC; Christopher J. Hamaty

(57) ABSTRACT

Outgoing data units, such as packets, from a computer system that contain data characteristic of an operating system executing on the computer system are intercepted before they are transmitted on a network and masked to impersonate a different operating system if the network is untrusted. The masking may be to re-fingerprint the data units by replacing the data characteristic of the actual operating system with data characteristic of the different operating system. Alternatively, the masking may require discarding the data unit and not transmitting it.

36 Claims, 5 Drawing Sheets

OTHER PUBLICATIONS

"ICMP Stands For Trouble", Rik Farrow, Network Magazine, Sep. 5, 2000, www.networkmagazine.com/article/NMG20000829S0003, 4 pages, Apr. 23, 2001.

"ICMP Usage In Scanning", Ofir Arkin, Jul. 2000, pp. 1-45.

"ICMP Usage In Scanning Or Understanding Some Of The ICMP Protocol's Hazards", Ofir Arkin, Founder—The Sys-Security Group, Version 2.5, Dec. 2000, pp. 1-9 43-45, 59, 68, 74, 77, 84, 87, 89, 107.

* cited by examiner

PREVENTION OF OPERATING SYSTEM IDENTIFICATION THROUGH FINGERPRINTING TECHNIQUES

FIELD OF THE INVENTION

This invention relates generally to network security, and more particularly to preventing the identification of the operating system executing on a networked computer.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2001, Networks Associates Technology, Inc., All Rights Reserved.

BACKGROUND OF THE INVENTION

Many security attacks on networked computers are based on specific known vulnerabilities and defects of a particular operating system. There are currently a very large number of vulnerabilities, and this number grows daily. The general goal of an attacker in using these vulnerabilities is to compromise the computer system that is executing the operating system, thus enabling the attacker to destroy, steal, modify data, or use the compromised system resources for misdeeds against others.

However, the vulnerabilities of one operating system cannot be used to attack a different operating system. For example, using an attack scheme specific to the Solaris® operating system from Sun Microsystems would not provide the attacker with the desired results if launched against a computer running a Windows® operating system from Microsoft. It is also common for an attacker to search for systems with specific operating systems because it increases the efficiency of the attack. This is analogous to "War Dialing" that uses a modem to dial ranges of phone numbers to find systems connected by phone line. Once an attacker has a list of "known systems," such as "all systems running Windows Millenium," the attacker can initiate specific attacks on those systems. Therefore, an attacker often eliminates attacks that would be pointless by first probing the targeted computer using techniques commonly referred to as "OS (operating system) fingerprinting."

OS fingerprinting relies on characteristic responses to certain messages to identify an operating system. For example, operating systems that support communications over a TCP/IP (Transmission Control Protocol/Internet Protocol) network each implement the TCP/IP stack differently. Thus, to identify the operating system for a computer on a TCP/IP network, an attacker could send certain types of TCP/IP packets to the targeted computer and then compare the responses received against the responses expected from various operating systems. One particularly powerful OS fingerprinting technique for TCP/IP networks relies on the Internet Control Message Protocol (ICMP), which is used to report errors in the processing of received packets. Ofir Arkin, ICMP *Usage in Scanning*, July 2000, available at the World Wide Web site for Sys-Security Group.

Inspecting all incoming packets to determine if a probe of the operating system identity is underway is impractical because of the number of different OS fingerprinting techniques and the difficulty of distinguishing legitimate network traffic from what is not. Instead, the prior art solutions to the problem focus on the outgoing packets. Arkin suggests blocking all outgoing ICMP packets. However, doing so prevents legitimate error messages from being communicated. Another proposed solution is to dynamically change the TCP/IP stack to emulate the TCP/IP stack of another operating system when processing outgoing packets. This approach is complex to implement and maintain, particularly for individual users or smaller organizations that do not have a dedicated computer support staff.

SUMMARY OF THE INVENTION

Outgoing data units, such as packets, from a computer system that contain data characteristic of an operating system executing on the computer system are intercepted before they are transmitted on a network and masked to impersonate a different operating system if the network is untrusted. The masking may be re-fingerprinting the data units by replacing the data characteristic of the actual operating system with data characteristic of the different operating system. Alternatively, the masking may require discarding the data unit and not transmitting it. In another aspect, when the actual operating system would not respond to certain incoming packets but the different operating system would respond, those certain incoming packets are intercepted and a response characteristic of the different operating system is sent to mask the actual operating system. The appropriate masking is specified by a security policy that identifies untrusted networks, the types of data units to be masked, the action to be taken to mask the data units, and re-fingerprinting data to be used as replacement data.

Masking the identity of the true operating system reduces the potential for an attacker to compromise the computer since the attacker is misled into attempting attacks that have no possibility of working. Because these types of attacks can be easily detected, they can be successfully countered. Integrating the masking technology of the present invention into a distributed personal-computer based firewall enables the firewall to provide a new level of stealth to the computer's network presence.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
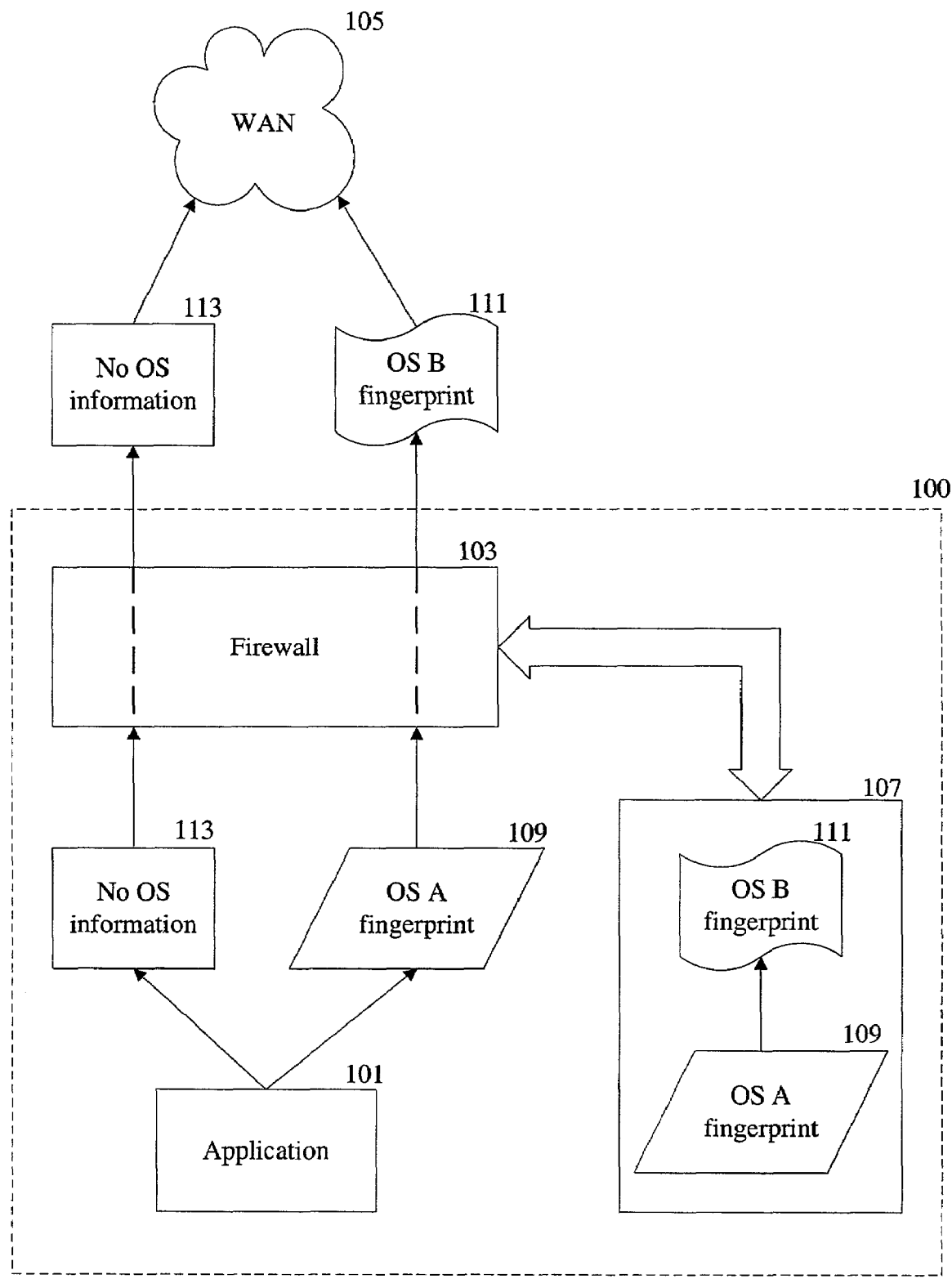
FIG. 1 is a diagram illustrating a system-level overview of an embodiment of the invention.

A system level overview of the operation of an embodiment of the invention is described by reference to FIG. 1. A computer system 100 is protected by a firewall 103 when an application 101 communicates with an untrusted wide-area network (WAN) 105, such as the Internet, that exposes the computer 100 to security attacks. To prevent an attacker on the WAN 105 from identifying the operating system, e.g., OS A, executing on the computer 100, the firewall 103 intercepts each outgoing packet 109 that contains information characteristic of the operating system, i.e., OS A fingerprint data, and replaces the OS A fingerprint data with information characteristic of a different operating system, i.e., OS B fingerprint data, to create a re-fingerprinted packet 111 that masks the true identity of the operating system. Packets 113 that contain no information that can be used to identify the operating system are passed through the firewall 103 unchanged. Additionally, if the computer 100 is coupled to a trusted network (not shown), such as a privately controlled corporate local-area network (LAN), packets that are addressed to a destination on the trusted network also are passed through the firewall 103 unchanged. The firewall 103 is configured through security policy, shown as OS fingerprint policy file 107, that identifies the untrusted network(s), the types of packets to be masked, the action to be taken to mask the packets, and re-fingerprinting data to be used as masking fingerprints. It will be appreciated that in some instances, the fingerprint policy file 107 may instruct the firewall 103 to discard the packet 109 rather than replacing fingerprint data. Furthermore, it will be appreciated that the policy file 107 may not instruct the firewall 103 to mask every type of packet that contains OS fingerprint data but only those that are deemed most critical, e.g., those most likely to be used to fingerprint the actual operating system. In an alternate embodiment not shown, the fingerprint policy file 107 also instructs the firewall 103 to intercept certain incoming data packets and send a false response to those data packets. Exemplary embodiments of the fingerprint policy file 107 are described in more detail below.

For example, when the members of the Windows operating system family receive an ICMP Echo Request packet with its CODE field set to a non-zero value, they echo back the packet with the CODE field re-set to zero, while other operating systems echo back the packet unchanged. Additionally, when the Windows 98, 98 SE, ME and 2000 operating systems receive an ICMP Timestamp Request that has the CODE field set to a non-zero value, they do not respond while other operating systems do. Thus, to mask a Windows operating system, the OS fingerprint policy file 107 would instruct the firewall 103 to intercept the outgoing response packet for the ICMP Echo Request and change the CODE field to the value of the CODE field in the corresponding ICMP Echo Request packet. If the actual operating system was Windows 98, 98 SE, ME or 2000, the OS fingerprint policy file 107 would also instruct the firewall 103 to intercept the incoming ICMP Timestamp Request packets and send a response that is characteristic of a different operating system.

For another example, when a LINUX operating system using a kernel prior to release 2.0.35 receives a TCP/IP SYN packet with an undefined flag set, LINUX responds with a packet that also has the undefined flag set, while other operating systems will not respond at all. Thus, to mask this version of LINUX, the fingerprint policy file 107 would instruct the firewall to discard the outgoing packet sent in response to the SYN packet.

A default OS fingerprint policy file 107 particular to the operating system and network 105 may be provided to the user or administrator of the computer 100 by the provider of the firewall 103. The default policy file 107 can be modified by the user or administrator. Additionally, different versions and updates may be downloaded into the computer 100 from a secure location on the network 105 or on a trusted network.

Figure 2:
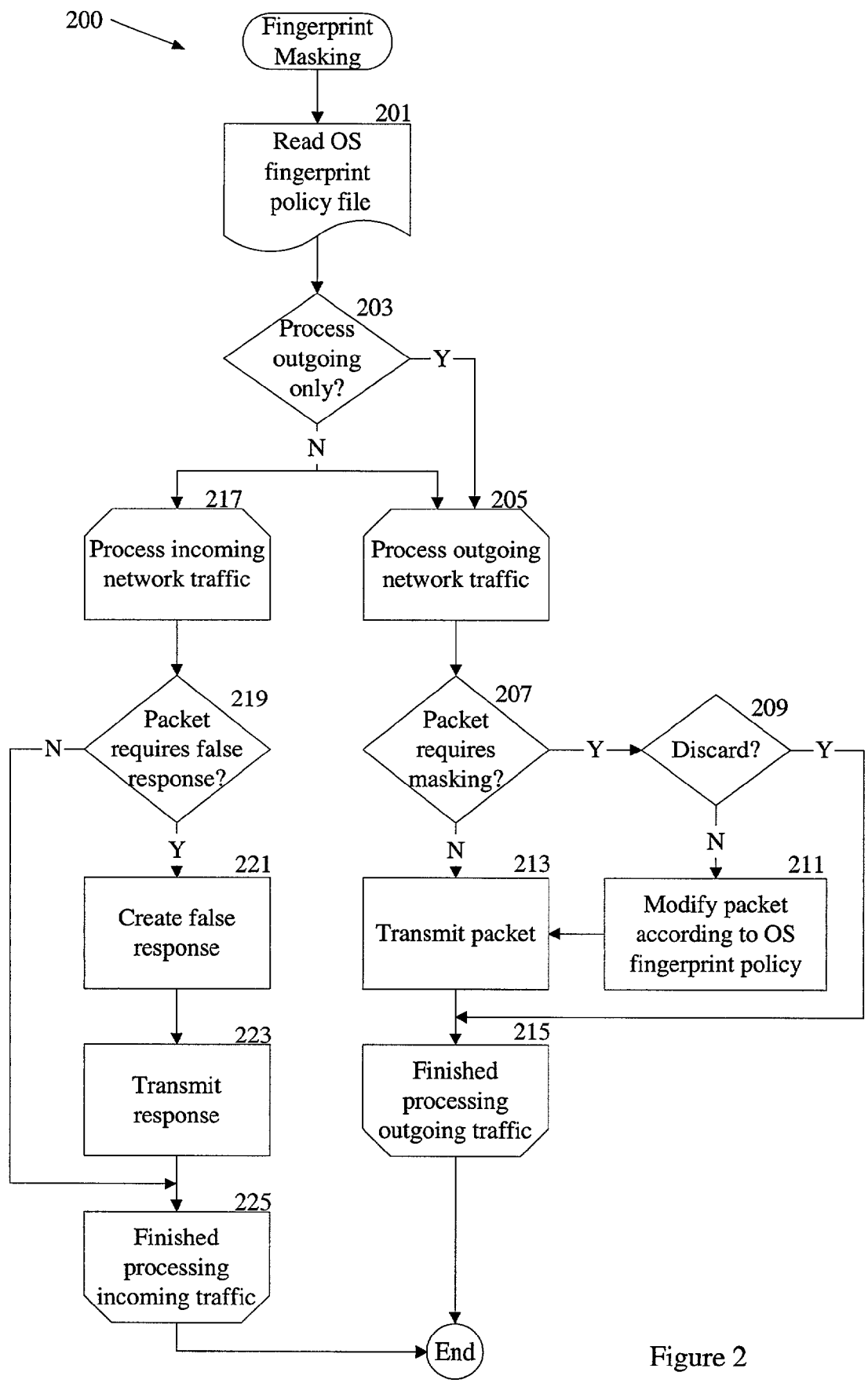
FIG. 2 is a flowchart of a method to be performed by a computer according to an embodiment of the invention.

Next, a particular OS fingerprint masking method to be performed by the computer 100 in accordance with one embodiment of the invention is described in terms of computer software with reference to a flowchart shown in FIG. 2. The method constitutes computer programs made up of computer-executable instructions illustrated as blocks (acts), including all the acts from 201 until 225 in FIG. 2. Describing the method by reference to a flowchart enables one skilled in the art to develop such programs including such instructions to carry out the method on suitably configured computers (the processing unit of the computer executing the instructions from computer-readable media). The computer-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or a produce a result. It also will be appreciated that more or fewer processes may be incorporated into the method illustrated in FIG. 2 without departing from the scope of the invention and that no particular order is implied by the arrangement of blocks shown and described herein.

In one embodiment, the fingerprint masking method 200 illustrated in FIG. 2 is executed as part of a software firewall 103 that is running on the computer 100. When the method 200 is initiated, it reads in the current OS fingerprint policy file 107 (block 201) and determines whether it will process only outgoing network traffic (block 203). Assuming for the moment that the method 200 will only process outgoing packets, the method begins an outgoing network traffic processing loop at block 205 that examines each packet sent from the computer to a network until the computer disconnects from the network(s) at block 215. If the packet needs to be masked because it is being sent to an address on an untrusted network and it contains OS fingerprint data (block 207), the method 200 determines the action to take to mask the packet according to OS fingerprint policy file. If the packet is to be discarded (block 209), the method 200 does not transmit the packet and continues to block 205 to await the next outgoing packet. If the packet is to be re-fingerprinted, it is modified at block 211. At block 213, the method transmits the re-fingerprinted packet, or the original packet if re-fingerprinting is not required, to the network.

Returning now to block 203, if the fingerprint policy file instructs the method 200 to process both incoming and outgoing packets, the method 200 begins the outgoing processing loop at block 205 and executes it as described above. The method 200 also begins an incoming network traffic processing loop at block 217 to intercept incoming packets from the network until the computer disconnects from the network(s) at block 225. If the actual operating system would normally not respond to the incoming packet, a false response is required to mask the operating system (block 219). The false response is created at block 221 and transmitted at block 223. If a false response is not required, no processing is performed by the method 200 for the incoming packet.

One of skill in the art will immediately recognize that the reading of the OS fingerprint policy file at block 201 may occur at various times, such as when the computer is booted, when a network connection is initially made, and/or when the policy settings change. Furthermore, it will be appreciated that the computer can impersonate multiple masking operating systems by loading different OS fingerprint policy files at different times, or by loading a single OS fingerprint policy file that contains re-fingerprinting data for multiple masking operating systems and dynamically switching between the re-fingerprinting data, or by assigning a different masking operating system to each untrusted network.

Figure 3:
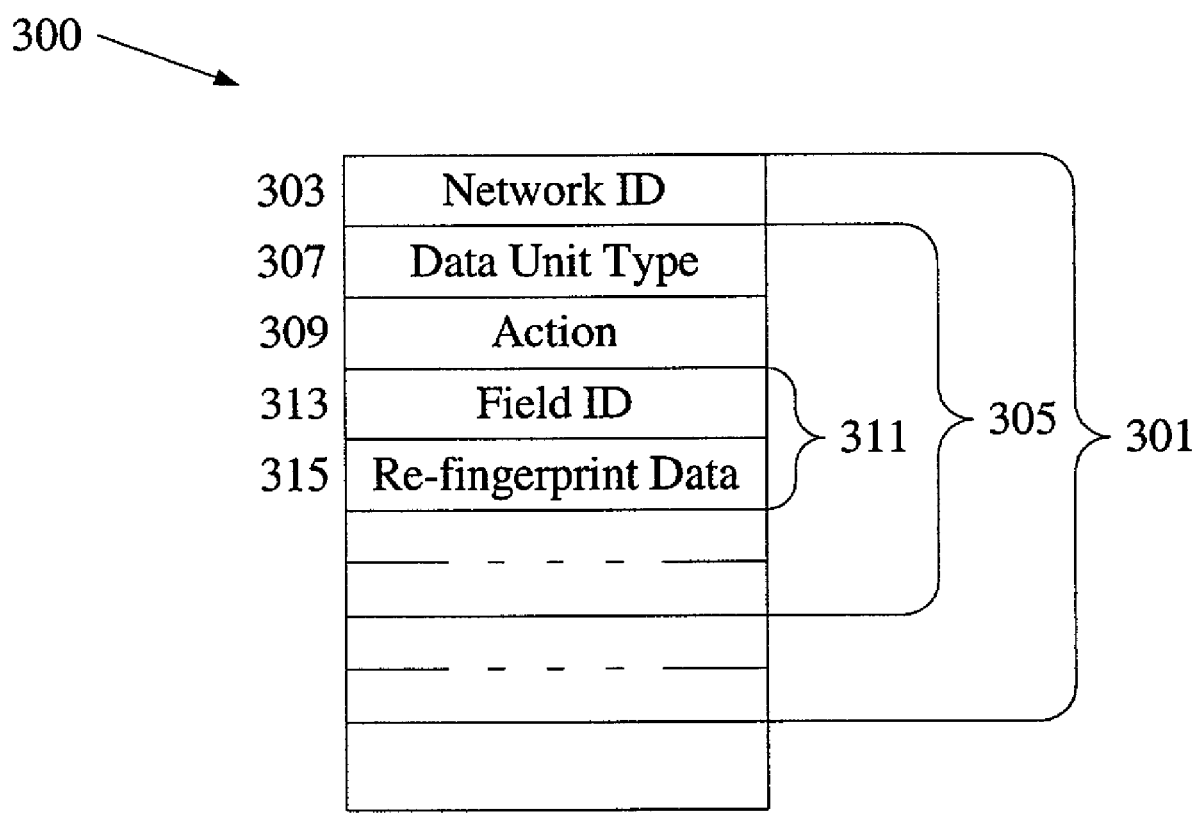
FIG. 3 is a diagram of a policy file data structure for use in an implementation of the invention.

In one embodiment, the OS fingerprint policy file is a data structure 300 as shown in FIG. 3. The policy file data structure 300 contains a network entry 301 for each untrusted network. The untrusted network is identified by network identifier 303, which may be a subnet mask, or a range of network addresses, or a key into another data structure that relates the key to the range of network addresses, or other identifier that uniquely defines the untrusted network. Each untrusted network entry 301 includes one or more data unit entries 305, each of which contains a data unit type field 307 to define a data unit, such as a packet, that itself, or its response, could be used to identify the actual operating system. Thus, the data unit type field 307 determines which data units, incoming or outgoing, are intercepted by the firewall. The data characteristics of the data unit type field 307 depends on the communications protocol of the untrusted network.

Each data unit entry 305 also specifies the action 309 to be taken to mask the actual operating system, such as discarding the data unit or re-fingerprinting the data if the data unit is outgoing to the untrusted network, or to send a false response if the data unit is incoming from the untrusted network. If the action is to re-fingerprint data, the data unit entry 305 further includes at least one re-fingerprinting entry 311 containing a field identifier 313 that specifies which field within the data unit is to be overwritten with re-fingerprinting data. A re-fingerprint data field 315 in the re-fingerprinting entry 311 contains the replacement data, or specifies where to obtain the replacement data, such as, for example, when the replacement data is in the corresponding incoming data unit. Similarly, when a false response is to be sent, the re-fingerprinting entry 311 contains the data for the false response.

It will be appreciated that each network entry 301 in the policy file data structure 300 may contain masking information for a different operating system. It will also be appreciated that an alternate embodiment of the policy file data structure 300 for a computer connected to only one network does not necessarily contain the network identifier field 303.

Figure 4A:
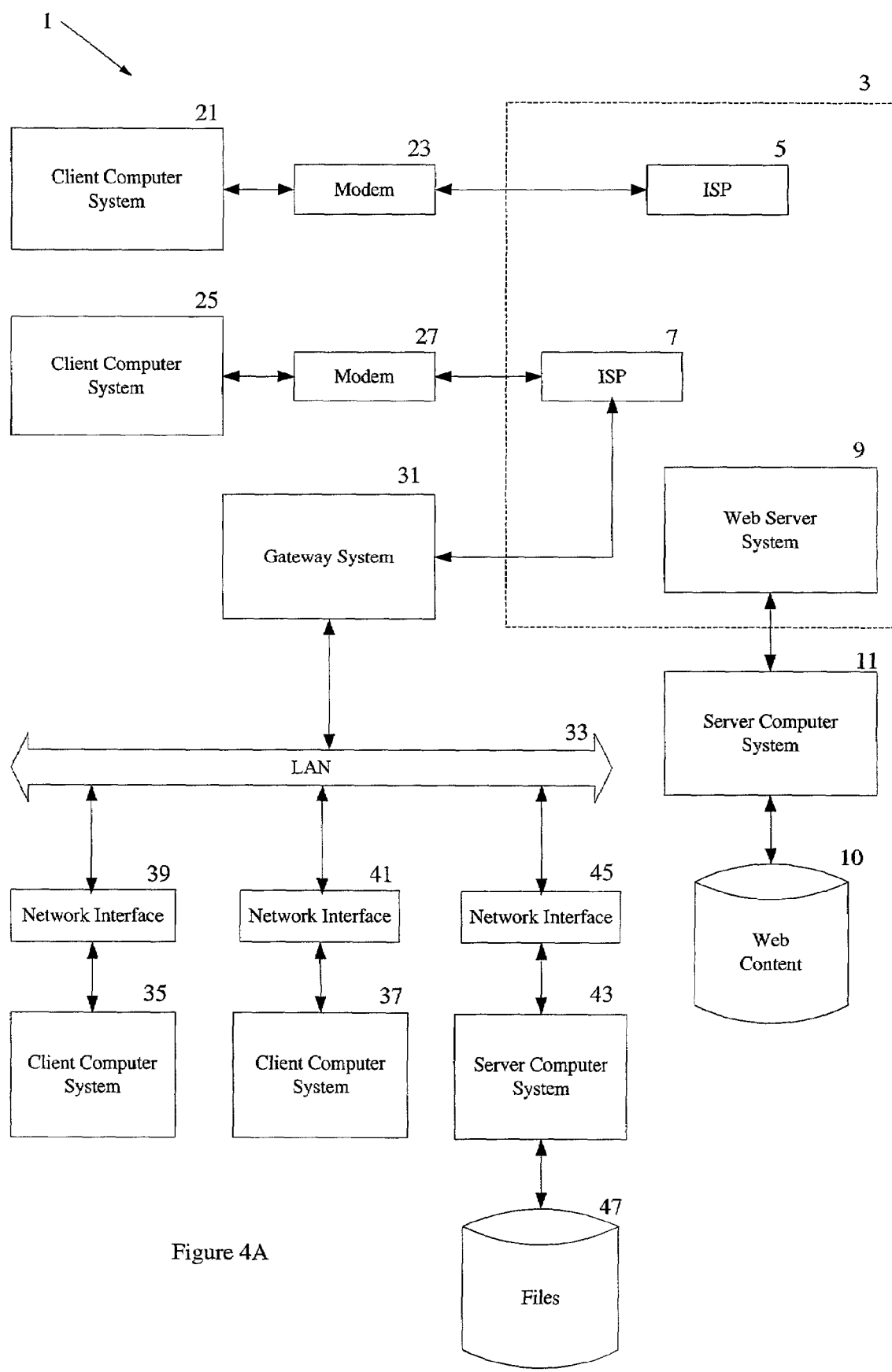
FIG. 4A is a diagram of one embodiment of an operating environment suitable for practicing the present invention.
Figure 4B:
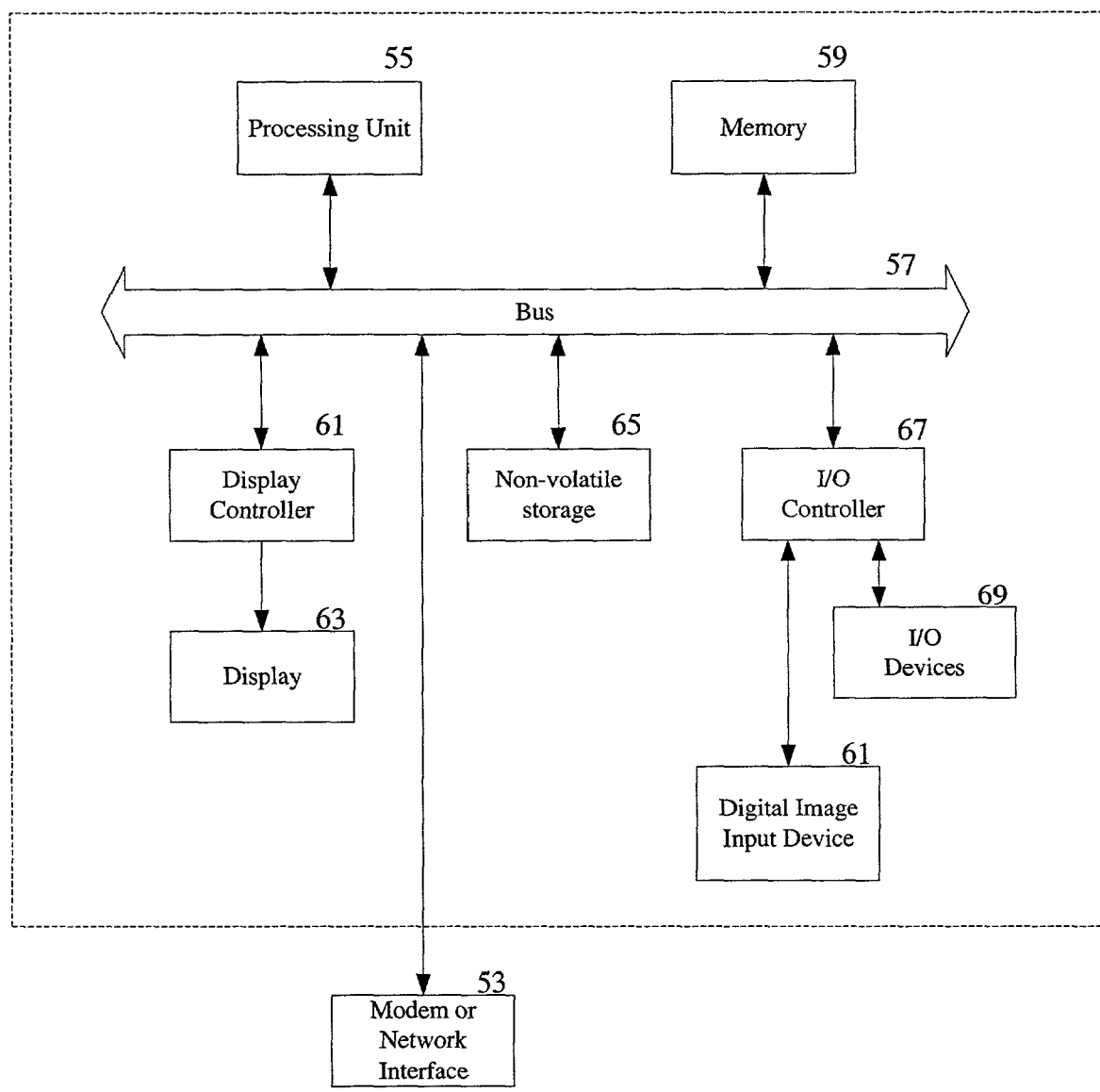
FIG. 4B is a diagram of one embodiment of a computer system suitable for use in the operating environment of FIG. 4A.

The following description of FIGS. 4A–B is intended to provide an overview of computer hardware and other operating components suitable for performing the methods of the invention described above, but is not intended to limit the applicable environments. One of skill in the art will immediately appreciate that the invention can be practiced with other computer system configurations, including hand-held devices, multiprocessor systems, microprocessor-based or programmable consumer electronics, network PCs, mini-computers, mainframe computers, and the like. The invention can also be practiced in distributed computing environments where tasks are performed by remote processing devices that are linked through a communications network having a physical or wireless infrastructure, or a combination of both.

FIG. 4A shows several computer systems that are coupled together through a network 3, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 3 is typically provided by Internet service providers (ISP), such as the ISPs 5 and 7. Users on client systems, such as client computer systems 21, 25, 35, and 37 obtain access to the Internet through the Internet service providers, such as ISPs 5 and 7, through either physical or wireless interfaces. Access to the Internet allows users of the client computer systems to exchange information, receive and send e-mails, and view documents, such as documents which have been prepared in the HTML format. These documents are often provided by web servers, such as web server 9 which is considered to be "on" the Internet. Often these web servers are provided by the ISPs, such as ISP 5, although a computer system can be set up and connected to the Internet without that system being also an ISP as is well known in the art.

The web server 9 is typically at least one computer system which operates as a server computer system and is configured to operate with the protocols of the World Wide Web and is coupled to the Internet. Optionally, the web server 9 can be part of an ISP which provides access to the Internet for client systems. The web server 9 is shown coupled to the server computer system 11 which itself is coupled to web content 10, which can be considered a form of a media database. It will be appreciated that while two computer systems 9 and 11 are shown in FIG. 4A, the web server system 9 and the server computer system 11 can be one computer system having different software components providing the web server functionality and the server functionality provided by the server computer system 11 which will be described further below.

Client computer systems 21, 25, 35, and 37 can each, with the appropriate web browsing software, view HTML pages provided by the web server 9. The ISP 5 provides Internet connectivity to the client computer system 21 through the modem interface 23 which can be considered part of the client computer system 21. The client computer system can be a personal computer system, a network computer, a Web TV system, a handheld wireless device, or other such computer system. Similarly, the ISP 7 provides Internet connectivity for client systems 25, 35, and 37, although as shown in FIG. 4A, the connections are not the same for these three computer systems. Client computer system 25 is coupled through a modem interface 27 while client computer systems 35 and 37 are part of a LAN. While FIG. 4A shows the interfaces 23 and 27 as generically as a "modem," it will be appreciated that each of these interfaces can be an analog modem, ISDN modem, cable modem, satellite transmission interface (e.g. "Direct PC"), radio frequency (RF), cellular, or other interfaces for coupling a computer system to other computer systems. Client computer systems 35 and 37 are coupled to a LAN 33 through network interfaces 39 and 41, which can be Ethernet network or other network interfaces. The LAN 33 is also coupled to a gateway computer system 31 which can provide firewall and other Internet related services for the local area network. This gateway computer system 31 is coupled to the ISP 7 to provide Internet connectivity to the client computer systems 35 and 37. The gateway computer system 31 can be a conventional server computer system. Also, the web server system 9 can be a conventional server computer system.

Alternatively, as is well-known, a server computer system 43 can be directly coupled to the LAN 33 through a network interface 45 to provide files 47 and other services to the clients 35, 37, without the need to connect to the Internet through the gateway system 31.

FIG. 4B shows one example of a conventional computer system that can be used as a client computer system or a server computer system or as a web server system. It will also be appreciated that such a computer system can be used to perform many of the functions of an Internet service provider, such as ISP 5. The computer system 51 interfaces to external systems through the modem or network interface 53. It will be appreciated that the modem or network interface 53 can be considered to be part of the computer system 51. This interface 53 can be an analog modem, ISDN modem, cable modem, token ring interface, satellite transmission interface (e.g. "Direct PC"), radio frequency (RF), cellular, or other interfaces for coupling a computer system to other computer systems. The computer system 51 includes a processing unit 55, which can be a conventional microprocessor such as an Intel Pentium microprocessor or Motorola Power PC microprocessor. Memory 59 is coupled to the processor 55 by a bus 57. Memory 59 can be dynamic random access memory (DRAM) and can also include static RAM (SRAM). The bus 57 couples the processor 55 to the memory 59 and also to non-volatile storage 65 and to display controller 61 and to the input/output (I/O) controller 67. The display controller 61 controls in the conventional manner a display on a display device 63 which can be a cathode ray tube (CRT) or liquid crystal display. The input/output devices 69 can include a keyboard, disk drives, printers, a scanner, and other input and output devices, including a mouse or other pointing device. The display controller 61 and the I/O controller 67 can be implemented with conventional well known technology. A digital image input device 61 can be a digital camera which is coupled to an I/O controller 67 in order to allow images from the digital camera to be input into the computer system 51. The non-volatile storage 65 is often a magnetic hard disk, an optical disk, or another form of storage for large amounts of data. Some of this data is often written, by a direct memory access process, into memory 59 during execution of software in the computer system 51. One of skill in the art will immediately recognize that the term "computer-readable medium" includes any type of storage device that is accessible by the processor 55 and also encompasses a carrier wave that encodes a data signal.

It will be appreciated that the computer system 51 is one example of many possible computer systems which have different architectures. For example, personal computers based on an Intel microprocessor often have multiple buses, one of which can be an input/output (I/O) bus for the peripherals and one that directly connects the processor 55 and the memory 59 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 59 for execution by the processor 55. A Web TV system, which is known in the art, is also considered to be a computer system according to the present invention, but it may lack some of the features shown in FIG. 4B, such as certain input or output devices. A typical computer system will usually include at least a processor, memory, and a bus coupling the memory to the processor.

It will also be appreciated that the computer system 51 is controlled by operating system software that includes a file management system, such as a disk operating system, which is part of the operating system software. One example of an operating system software with its associated file management system software is the family of operating systems known as Windows® from Microsoft Corporation of Redmond, Wash., and their associated file management systems. The file management system is typically stored in the non-volatile storage 65 and causes the processor 55 to execute the various acts required by the operating system to input and output data and to store data in memory, including storing files on the non-volatile storage 65.

Data units containing OS fingerprint data and destined for an untrusted network are masked by a firewall to impersonate a different operating system as specified in a security policy. Thus, an attacker receiving the masked packets is mislead into attempting OS-specific attacks on the computer that cannot succeed. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, those of ordinary skill in the art will appreciate that while the invention has been described in terms of firewall software executing on the processing unit of the computer the firewall is protecting, the present invention is equally applicable to firewall software executing on a processing unit for a hardware firewall. Furthermore, those of ordinary skill within the art will appreciate that while the invention has been described in terms of a network that exchanges data in packets for sake of clarity, the invention is equally applicable to other types of network data structures.

The terminology used in this application with respect to networks is meant to include all environments in which a computer system is connected to a network and communicating to other computer systems on the network through a network communications protocol. Therefore, it is manifestly intended that this invention be limited only by the following claims and equivalents thereof.

What is claimed is:

1. A computerized method to prevent identification of an operating system executing on a computer connected to a network comprising:
   intercepting a portion of outgoing network data characteristic of the operating system; and
   conditionally masking the portion of outgoing network data to impersonate a different operating system in accordance with a security policy if the network is an untrusted network;
   wherein masking the portion comprises:
      replacing the portion of outgoing network data with data characteristic of the different operating system to prevent identification of the operating system by impersonating the different operating system, for misleading attackers into attempting attacks that are unworkable on the operating system.

2. The computerized method of claim 1, wherein the security policy identifies the portion of outgoing network data and specifies an action to take to mask the portion of outgoing network data.

3. The computerized method of claim 1, wherein the security policy further specifies replacement data for the portion of outgoing network data, the replacement data characteristic of the different operating system.

4. The computerized method of claim 1, wherein the security policy further defines the network as untrusted.

5. The computerized method of claim 1 further comprising:
   receiving the security policy through the network.

6. The computerized method of claim 1 further comprising:
   modifying the security policy based on user input.

7. The computerized method of claim 1 further comprising:
   transmitting the portion of outgoing network data unchanged if the network is a trusted network.

8. The computerized method of claim 1 further comprising:
   intercepting a portion of incoming network data; and
   sending a false response to the portion of incoming network data to impersonate the different operating system in accordance with the security policy if the network is an untrusted network.

9. The computerized method of claim 8, wherein the security policy identifies the portion of incoming network data and the false response.

10. The computerized method of claim 8, wherein the false response is sent if the operating system would normally not respond to the incoming network data.

11. The computerized method of claim 1, wherein the method is integrated into a firewall that protects the computer.

12. The computerized method of claim 1, wherein the security policy contains data on a plurality of different operating systems for allowing the portion of outgoing network data to impersonate any one of the plurality of different operating systems.

13. The computerized method of claim 12, wherein each of the different operating systems included in the plurality of different operating systems is assigned a specific untrusted network for masking the portion of outgoing data according to the untrusted network.

14. A computer-readable medium having executable instructions to cause a computer to perform a method comprising:
   intercepting a portion of outgoing network data characteristic of an operating system executing on the computer when the computer is connected to a network; and
   conditionally masking the portion to impersonate a different operating system in accordance with a security policy if the network is an untrusted network;
   wherein masking the portion comprises:
   replacing the portion with data characteristic of the different operating system to prevent identification of the operating system by impersonating the different operating system, for misleading attackers into attempting attacks that are unworkable on the operating system.

15. The computer-readable medium of claim 14, wherein the security policy identifies the portion and specifies an action to take to mask the portion.

16. The computer-readable medium of claim 14, wherein the security policy further specifies replacement data for the portion, the replacement data characteristic of the different operating system.

17. The computer-readable medium of claim 14, wherein the security policy further defines the network as untrusted.

18. The computer-readable medium of claim 14, wherein the method further comprises:
   receiving the security policy through the network.

19. The computer-readable medium of claim 14, wherein the method further comprises:
   modifying the security policy based on user input.

20. The computer-readable medium of claim 14, wherein the method further comprises:
   transmitting the portion unchanged if the network is a trusted network.

21. The computer-readable medium of claim 14, wherein the method further comprises:
   intercepting a portion of incoming network data; and
   sending a false response to the portion of incoming network data to impersonate the different operating system in accordance with the security policy if the network is an untrusted network.

22. The computer-readable medium of claim 21, wherein the security policy identifies the portion of incoming network data and the false response.

23. The computer-readable medium of claim 14, wherein the instructions are operable for integration into a firewall.

24. A computerized system comprising:
   a processing unit;
   a memory coupled to the processing unit through a bus;
   a network interface coupled to the processing unit through the bus and further operable for coupling to a network;
   an operating system executed from the memory by the processing unit; and
   a fingerprint masking process executed from the memory by the processing unit to cause the processing unit to intercept a portion of network data characteristic of the operating system when the network interface is coupled to the network, and to conditionally mask the portion to impersonate a different operating system in accordance with a security policy if the network is an untrusted network;
   wherein the fingerprint masking process further causes the processing unit to mask the portion by replacing the portion with data characteristic of the different operating system to prevent identification of the operating system by impersonating the different operating system, for misleading attackers into attempting attacks that are unworkable on the operating system.

25. The computerized system of claim 24, wherein the fingerprint masking process further causes the processing unit to transmit the portion unchanged if the network is a trusted network.

26. The computerized system of claim 24, wherein the fingerprint masking process further causes the processing unit to receive the security policy through the network interface.

27. The computerized system of claim 24 further comprising a user input device coupled to the processing unit through the bus and wherein the fingerprint masking process further causes the processing unit to receive input through the user input device and to modify the security policy based on the input.

28. The computerized system of claim 24, wherein the fingerprint masking process further causes the processing unit to intercept a portion of incoming network data when the network interface is coupled to the network, and to send a false response to the portion of incoming network data to impersonate the different operating system in accordance with the security policy if the network is an untrusted network.

29. The computerized system of claim 24, wherein the fingerprint masking process is integrated into a firewall process that is executed by the processing unit.

30. The computerized system of claim 24, wherein the computerized system is a firewall and the fingerprint masking process masks an operating system on a computer coupled to the firewall.

31. A computer-readable medium having stored thereon an OS fingerprint policy data structure comprising:
   a data unit type field containing data representative of an identifier for a type of data unit, wherein information associated with the data unit is characteristic of an operating system; and
   an action field containing data representative of an action to be taken to mask the information associated with the data unit identified by the data unit type field;
   wherein masking the information comprises:
   replacing the information with information characteristic of a different operating system to prevent identification of the operating system by impersonating the different operating system, for misleading attackers into attempting attacks that are unworkable on the operating system.

32. The computer-readable medium of claim 31 further comprising:
   a re-fingerprint field containing data representative of an identifier for a field type within the data unit type identified by the data unit type field, and further containing re-fingerprint data that identifies replacement data for the field identified by the field type.

33. The computer-readable medium of claim 32, wherein the re-fingerprint data is selected from the group consisting of the replacement data and a location for the replacement data.

34. The computer-readable medium of claim 31 further comprising:
   a re-fingerprint field containing data representative of an identifier for a field type within a false response to the data unit type identified by the data unit type field, and further containing re-fingerprint data that identifies false data for the field identified by the field type.

35. The computer-readable medium of claim 34, wherein the re-fingerprint data is selected from the group consisting of the false data and a location for the false data.

36. The computer-readable medium of claim 31 further comprising:
   a network identifier field containing data representative of an identifier for a network that is untrusted when transmitting the type of data unit identified by the data unit type field.

* * * * *